United States Patent
Naim et al.

(10) Patent No.: US 8,111,689 B2
(45) Date of Patent: Feb. 7, 2012

(54) SYSTEM FOR UPLINK SCHEDULING PACKET BASED DATA TRAFFIC IN WIRELESS SYSTEM

(75) Inventors: Ghassan Naim, Irving, TX (US); Naveen Kakani, Denton, TX (US); Lasse Huovinen, Irving, TX (US); Chris Clanton, Richardson, TX (US)

(73) Assignee: Nokia Corporation, Espoo (FI)

( * ) Notice: Subject to any disclaimer, the term of this patent is extended or adjusted under 35 U.S.C. 154(b) by 885 days.

(21) Appl. No.: 09/759,153

(22) Filed: Jan. 16, 2001

(65) Prior Publication Data
US 2002/0093953 A1 Jul. 18, 2002

(51) Int. Cl.
*H04L 12/50* (2006.01)
(52) U.S. Cl. ......... 370/386; 370/328; 370/346; 370/412
(58) Field of Classification Search .......... 370/328, 370/329, 338, 341, 386, 412, 420, 468, 477, 370/342, 346; 455/450–452, 560, 561, 446
See application file for complete search history.

(56) References Cited

U.S. PATENT DOCUMENTS

| | | | | |
|---|---|---|---|---|
| 5,485,631 A | * | 1/1996 | Bruckert | 455/446 |
| 5,835,889 A | * | 11/1998 | Kapanen | 704/215 |
| 5,914,950 A | * | 6/1999 | Tiedemann et al. | 370/348 |
| 6,097,733 A | * | 8/2000 | Basu et al. | 370/468 |
| 6,285,665 B1 | * | 9/2001 | Chuah | 370/319 |
| 6,351,461 B1 | * | 2/2002 | Sakoda et al. | 370/335 |
| 6,359,898 B1 | * | 3/2002 | Cudak et al. | 370/442 |
| 6,466,544 B1 | * | 10/2002 | Sen et al. | 370/231 |
| 6,504,834 B1 | * | 1/2003 | Fifield | 370/345 |
| 6,636,496 B1 | * | 10/2003 | Cho et al. | 370/335 |
| 6,694,147 B1 | * | 2/2004 | Viswanath et al. | 455/517 |
| 6,735,188 B1 | * | 5/2004 | Becker et al. | 370/342 |
| 6,785,262 B1 | * | 8/2004 | Yao et al. | 370/352 |
| 6,975,604 B1 | * | 12/2005 | Ishida et al. | 370/331 |
| 2002/0114292 A1 | * | 8/2002 | Kawabata et al. | 370/329 |

FOREIGN PATENT DOCUMENTS

| | | |
|---|---|---|
| EP | 0 981 229 A2 | 2/2000 |
| EP | 1006695 A1 * | 6/2000 |
| JP | 09-214459 | 8/1997 |
| JP | 11-069431 | 3/1999 |
| WO | WO99/31823 | 6/1999 |

* cited by examiner

*Primary Examiner* — Hassan Kizou
*Assistant Examiner* — Toan D Nguyen
(74) *Attorney, Agent, or Firm* — Alston & Bird LLP

(57) ABSTRACT

A system for allocating bandwidth resources among various mobile stations which are wirelessly connected to a base station. The length of the data queue in each mobile station is determined and information regarding that length is placed in a field in the outgoing data packet. When it is received in the base station, this field is decoded and the queue length information used to allocate bandwidth resources among the mobile station connections. This allows a very quick response to data queue lengths and accordingly better service.

66 Claims, 2 Drawing Sheets

SYSTEM FOR UPLINK SCHEDULING PACKET BASED DATA TRAFFIC IN WIRELESS SYSTEM

BACKGROUND OF THE INVENTION

1. Field of the Invention

This invention relates generally to a system for allocating resources for data streams and more particularly to a system for allocating transmission resources in a wireless system where the data includes an indication of its own resource needs.

2. Description of the Background

In networks and other arrangements, a situation often develops where a limited number of resources, such as bandwidth must be shared among a plurality of links. In particular, in a wireless type network, a number of mobile stations may be connected to a base station by wireless connections. Each base station may have only a limited number of channels to make these connections. Since many such mobile devices now utilize more than basic voice data, the amount of data which flows can vary substantially. Thus in addition to voice communications, wireless devices may include real time video, e-mail, web based information, etc. In order to fairly allocate the resources available, it is necessary for the base station to make some judgment as to which mobile stations can utilize the channels, and for how long.

The simplest arrangement, and one used largely in the past for voice data, is merely to dedicate a single channel for a single mobile station as long as it is connected. Only the assigned mobile station can use the channel. Depending on the original request, it is possible to assign more than a single channel but these multiple channels remain dedicated to that mobile station until the connection is terminated. No information is shared about the instantaneous amount of data waiting in the mobile station.

Another manner of handling the situation is to utilize a polling scheme where the base station polls each mobile station to learn the status of the data queue in each mobile station.

This allows the base station to determine how to share the bandwidth resources among the different mobile stations. Thus, when polled the mobile station can send a response indicating whether it has data to transmit. For example, in a global system for mobile devices (GSM) time division multiple access (TDMA) system, the transmission opportunity for a mobile station is granted n frames after the base station receives the polling response from the mobile station, where n is the number of frames required to transmit a data block in the channel. Thus, there is a delay of multiple frames after polling, before an adjustment can be made.

Unfortunately, real time traffic such as video conference has unpredictable fluctuations in the data rate. Thus, any delay in adjusting the resources may mean that a link to a mobile station may not always have data in its transmission queue.

Since a dedicated channel assignment scheme does not allow any other mobile stations to use the channel when the assigned mobile station uplink queue is empty, the bandwidth assigned will not be used, which lowers overall spectrum efficiency. This leads to poor bandwidth utilization which will only get worse as the number of connections in the system increases. Also, during high data rate periods, the number of real time packets waiting in the uplink queue will increase. Due to the limited bandwidth share assigned to the mobile station, packet congestion can occur and an increasing number of packets can exceed their delay requirements therefore decreasing the quality of service perceived by the end user. While the polling scheme is more efficient than a dedicated channel assignment scheme from the perspective of bandwidth utilization, some bandwidth is still wasted because the mobile station cannot send actual data when sending a polled response. As polling becomes more frequency, more bandwidth is wasted. Further, additional delay is introduced because the packet has to wait while the poll is received and answered. Thus, the delay will further slow down transmission and counteracts any benefits gained by the polling.

SUMMARY OF THE INVENTION

Accordingly, the present invention provides a system for allocating transmission resources between the base station and a series of mobile stations.

The present invention also provides a method for allocating resources based on the amount of data waiting in a queue in each mobile station.

The present invention also provides a system for allocating bandwidth resources between a plurality of mobile stations and a single base station in a wireless network.

The present invention further provides a method for allocating bandwidth resources between a plurality of mobile stations and a single base station in a wireless network.

The present invention further provides a system for transmitting information concerning the amount of data in a queue so that resources may be allocated appropriately for the most efficient use of the resources.

The present invention still further provides a method for transmitting information regarding the amount of data stored in a queue in a mobile station in a wireless network.

Briefly, this invention is achieved by using a plurality of bits in each data segment to describe the size of one of the queues in that mobile station. Once this is received in the base station, additional resources can be allocated if necessary.

A more complete appreciation of the invention and many of the attendant advantages thereof will be readily obtained as the same becomes better understood by reference to the following detailed description when considered in connection with the accompanying drawings, wherein:

DETAILED DESCRIPTION

DESCRIPTION OF THE PREFERRED EMBODIMENTS

Figure 1:
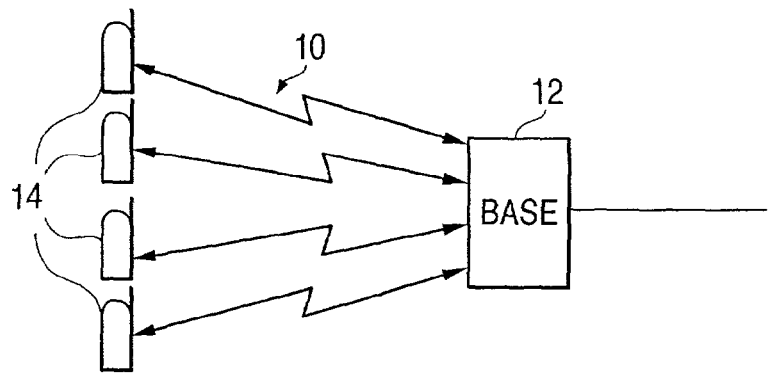
FIG. 1 is a schematic diagram showing the arrangement of the present system.

Referring now to the drawings, wherein like reference numerals designate identical or corresponding parts throughout the several views and more particularly to FIG. 1 thereof, wherein the wireless system 10 is shown as including a base station 12 and mobile stations 14. As indicated in the figure, the individual mobile stations may be connected to the base station by wireless connections. Since the base station is allowed to use only a certain range of frequencies, there is limit to the bandwidth available to the mobile stations. Since this resource is limited, it is necessary to allocate this bandwidth so that the greatest amount of data can be moved in the shortest time. This improves the quality of service and avoids unnecessary delay for the users.

The present invention improves on previous schemes by allocating the bandwidth among the various mobile stations which are currently connected to the base station. In order to do this, it is necessary for the base station to have some idea of the amount of data in the queue in the individual mobile stations. Prior art systems do not provide for this information to be given to the base station, nor are the resources allocated in real time based on this information.

Of course, each mobile station can have more than one connection for different types of data (voice, e-mail, video, etc). It is even possible to have multiple connections of a single type of data. Each type of data is handled separately.

Data which is sent from the mobile stations to the base station is arranged in blocks according to the protocol governing the apparatus. Of course, different data types may include blocks simultaneously. Thus, such blocks include not only the data itself, but identification information and other bits which may be used for other purposes such as error checking, etc. In particular, in the enhanced general packet data radio services system (EGPRS), there is provided a field of four bits which are known as the countdown value CV of the block. Under the current scheme, the bandwidth allocated to the mobile station is fixed and these four bits indicate the queue length of that mobile station. In particular, it indicates the number of data blocks in the queue as long at it is less than 16. This provides an estimate of when the current data transfer will be finished. However, this is not used in any manner to control the resources available. Different data types from the same mobile station utilize different queues. Thus, the voice is handled separately from the video, etc. Each queue has its own CV.

In the present arrangement, these four bits instead provide an indication of the data in the queue so that the base station may determine if additional resources are necessary in order to move the data at the optimum speed. Each service type (e.g. voice, video, email) will use a separate queue in the mobile station and each queue will have an associated CV. While the particular data included in the four bits of the CV may have various different meanings, the preferred arrangement is to let the values of 0-8 indicate the number of data segments in the queue. These values will indicate a queue length if it is less than or equal to the segment rate. This segment rate is the parameter which is established between the mobile station and the base station during the set up phase. If the queue length exceeds the segment rate, the values of 9-15 in the four bit field indicate the additional bandwidth which is required in order to meet the delay/rate requirement of the packet.

Thus, as the individual packets are sent from the mobile station to the base station, the base station examines this four bit field and notes the situation in the corresponding queue at that mobile station. If additional resources are necessary, the base station will allocate additional bandwidth to that connection so that the data stored in the queue will move faster. This of course assumes that sufficient resources are available to add resources to that connection. Clearly, the base station must consider all of the requests of all of the connections before allocating these resources. Since the four bit field is sent with every packet, the base station is constantly updated as to the situation in each mobile station. Accordingly, it can closely monitor the situation and adjust it over a very short time period to improve the utilization of its resources. This arrangement is much faster than the polling scheme because the information is provided in each packet without wasting bandwidth for the polling communications. Further, the present arrangement utilizes a four bit field which is already present according to the current protocols. It is only necessary to provide that the base station and mobile station each have a proper system for adding the data and using the data.

Figure 2:
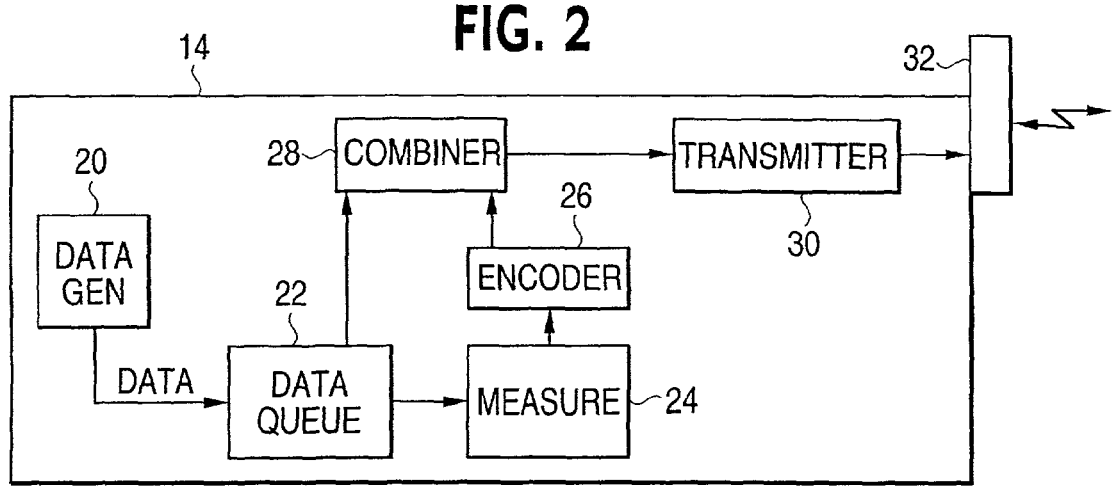
FIG. 2 is a block diagram showing a mobile station according to the present invention.

FIG. 2 shows a block diagram of a mobile station 14. While the station is shown as including a number of circuits, in fact, these functions could also be performed by software in a processor. A data generator 20 produces the data which is to be transmitted by the mobile station. This can include any of the normal devices which are utilized in a mobile station to produce data including a microphone to produce voice data, a keyboard to produce alpha numeric data, a camera for producing video data, etc. The specific type of data generation is not critical to the operation of the present invention. However, no matter what type of data is produced, it is sent to a data queue 22 to await its transmission. A queue length measuring device 24 observes the amount of data in the queue and determines the queue length. This queue length information is sent to encoder 26 which determines the four bit code to place in the field based on the length of the queue. Thus, in the preferred system described above, if the queue is less than the segment rate, a value between zero and eight is encoded and if the queue length is greater than the segment rate a value between nine and fifteen is encoded. The exact value in either of these ranges depends on the length of the queue. Other schemes of encoding could easily be used also merely by changing the encoding scheme. Thus, it would be possible to use a queue length value only if preferred or only a value for additional bandwidth. Other values could also be utilized as long as they relate in some manner to the length of the queue and can be utilized in the base station to allocate the bandwidth appropriately. Obviously, some encoding schemes will provide better information and allow for more appropriate allocation of resources.

Once the four bit code has been generated, it is added to the data block in a combiner 28. Thus, the code is added to the data block only when it reaches the front of the line in the queue so that the most updated information about the length of the queue can be given. Alternatively, the code can be added based on the length of the queue when the data block enters the queue, but this information would be slightly less fresh. In this alternative arrangement, the combiner would make the combination as the data enters the queue. In either case, when the packet is ready for transmission, it is sent to transmitter 30 so as to be connected to the base station through antenna 32.

Figure 3:
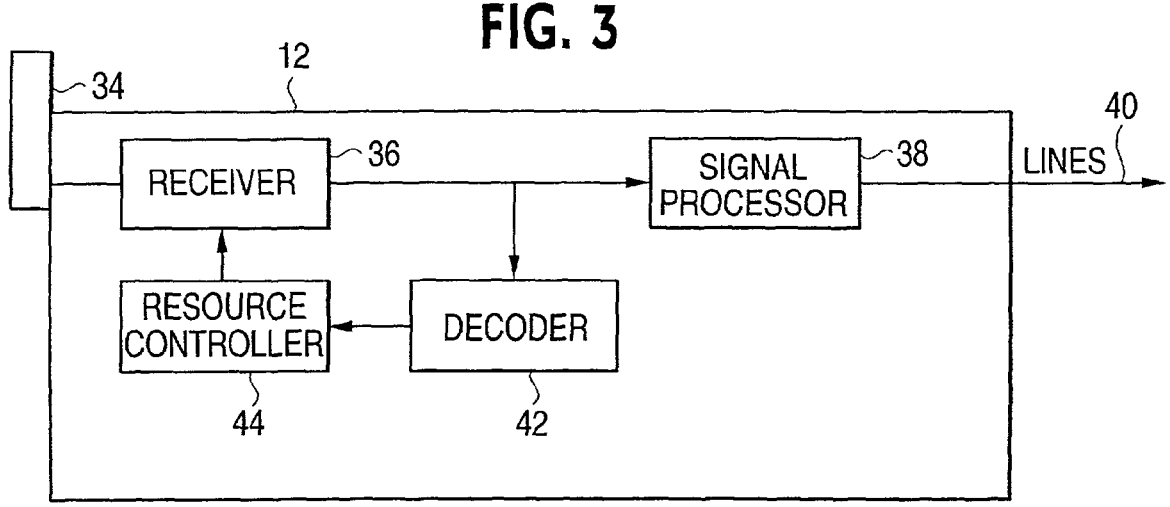
FIG. 3 is a block diagram showing a base station according to the present invention.

As shown in FIG. 3, base station 12 includes an antenna 34 and receiver 36 which receive the packet transmitted from antenna 32. Of course, this antenna and receiver are in communication with several mobile stations at the same time. For simplicity of discussion, it will, however, be discussed as if only a single mobile station were connected at a time. The receiver 36 forwards the received data onto signal processor 38 for further handling of the data and eventual connection of the data to output lines 40. However, decoder 42 looks at the data signal and determines the code in the four bit field which represents the queue length information. This decoder then provides the queue length information for the associated mobile station to the resource controller 44. The resource controller determines the situation in the data queue in the associated mobile station and determines whether additional resources should be allocated to that mobile station connection and if the resources are available. The controller obviously must prioritize the needs of the various stations in view of the resources available and distribute them in the most effective manner. This controller then determines the various bandwidth resources available for each mobile station and controls the receiver to arrange this. The actual decision process as to how to allocate the resources based on this information may vary. It may take into consideration the importance of the information, its time sensitivity, the importance of the particular user, or other factors in addition to the amount of data in each station. However, the allocation should be such as to give the best quality of service to as many stations as possible. However, the simple manner of making this choice is merely to allocate the most resources to the station with the largest queue without lowering the segment rate which has been guaranteed. Just as in the mobile stations, the various circuitry indicated for the base station may actually be hardwired devices or may be programmed functions of a processor.

In a preferable system, the real time data packet is split into data segments for the purpose of transmission. In packet cellular systems, data segments correspond to a radio link control/multiple access control (RLC/MAC) block, which is a layer 2 data block. Each data segment is transmitted individually over the transmission media when the opportunity is granted. A transmission opportunity is defined as any method used to transport a data segment on the transmission media. For example, in a time division multiple access system (TDMA) the transmission opportunity is a time slot and in a wideband code division multiple access (WCDMA) system it is the utilization of a unique WALSH code in a radio frame. The radio frame is shared by multiple users using different WALSH codes. The base station schedules the data packets and organizes the transmission opportunities for current user traffic. The present invention presents a model that will help the scheduling in the base station to provide for optimum service for all users in the uplink direction. Traffic information is sent in each block in the uplink. By including this information in one field of the block, real time information is provided to enable better scheduling.

While this arrangement has been described in terms of a wireless connection between a mobile station and a base station, it could also be applied to other systems where the connections are made by wire, fiber optic cable, etc. The only requirement is that the queue length information can be sent with the data block and that the resources can be allocated based on this data.

Figure 4:
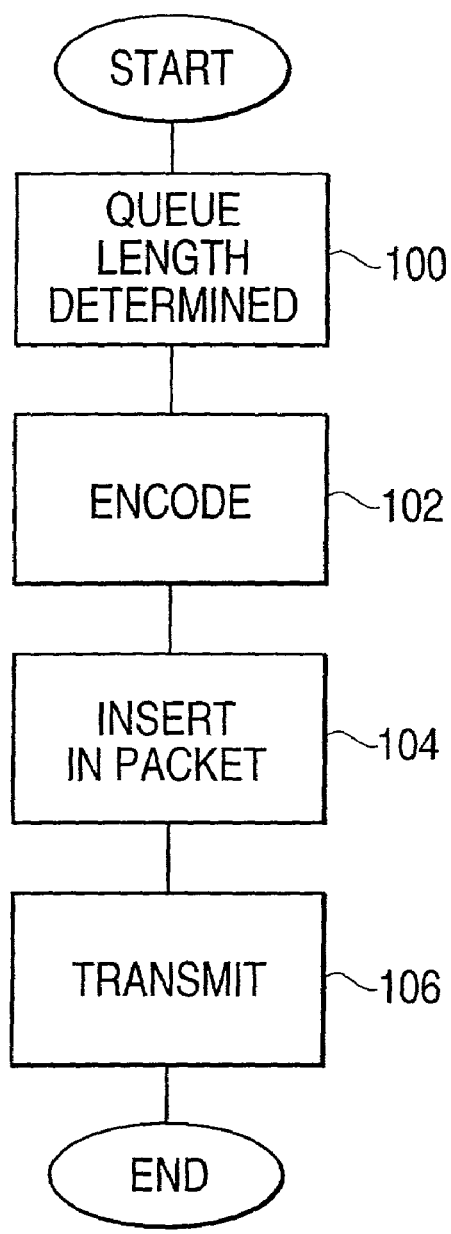
FIG. 4 is a flow chart showing the method of determining the queue length.
Figure 5:
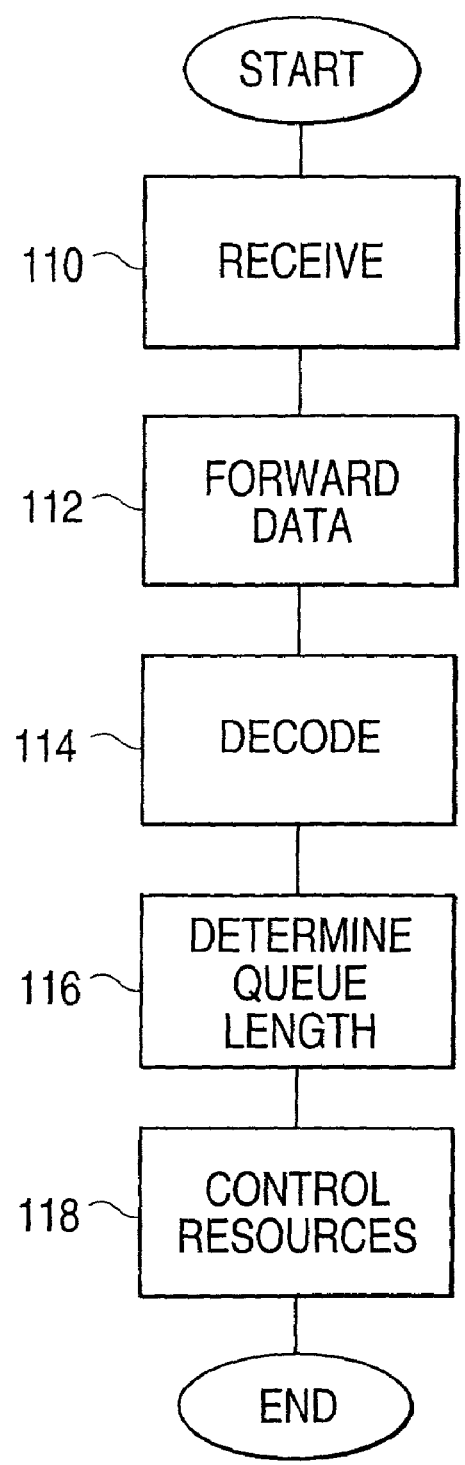
FIG. 5 is a flowchart showing the method of utilizing the information.

The method of operation of this system is seen in the flow charts of FIGS. 4 and 5. FIG. 4 relates to the method of determining the queue length and encoding the four bit field in the mobile station. In step 100, the data queue length is determined. In step 102 the determined length is converted to a four bit code which is related to the queue length. This code is inserted in the data packet in step 104. The packet is then transmitted in step 106.

FIG. 5 shows the method of utilizing this information in the base station. In step 110, the signal from a particular mobile station is received. In step 112 the data is forwarded. In step 114 a decoder receives the encoded four bit field and decodes it. In step 116 the resource controller receives the decoded information and determines the length of the queue. In step 118, the resources are based on this information.

Numerous additional modifications and various of the present invention are possible in light of the above teachings. It is therefore to be understood that within the scope of the appended claims, the invention may be practiced otherwise than is specifically described herein.

The invention claimed is:

1. A method, comprising:
monitoring a length of a data queue in a first network element as an indication of future need of communication resources in the first network element, wherein the monitoring comprises monitoring a coded value of the length of the data queue in the first network element, and wherein the coded value of the length of the data queue is embedded in a data block from the first network element;
determining, based at least in part on the coded value, whether the length of the data queue exceeds a segment rate; and
in an instance in which it is determined that the length of the data queue exceeds the segment rate, allocating additional communications resources for a transmission between the first network element and a second network element based at least in part on the coded value.

2. The method according to claim 1, wherein the monitoring further comprises monitoring information about a transmit buffer of the first network element.

3. The method according to claim 1, wherein the monitoring further comprises monitoring information on additional resources needed by said first network element.

4. The method according to claim 1, wherein the first network element comprises a mobile station and the second network element comprises a base station of a wireless communication network.

5. The method according to claim 1, wherein the monitoring further comprises receiving data packets and wherein each of a plurality of the data packets comprises the indication of the length of the data queue.

6. The method of claim 1, wherein the monitoring further comprises monitoring a countdown value of the data block for an indication of the length of the data queue.

7. The method of claim 1, further comprising, in an instance in which it is determined that the length of the data queue exceeds the segment rate:
determining an amount of additional bandwidth required to meet one or more of a delay or a rate requirement for data to be sent by the first network element; and
wherein allocating additional communications resources comprises allocating additional communication resources based at least in part on the determined amount of additional bandwidth.

8. The method of claim 1, wherein the coded value is less than a predefined value in an instance in which the length of the data queue is less than the segment rate, and wherein the coded value is at least the predefined value in an instance in which the length of the data queue exceeds the segment rate, and wherein determining whether the length of the data queue exceeds the segment rate comprises comparing the coded value to the predefined value.

9. A system, comprising:
a plurality of first stations;
a second station connected to the plurality of first stations through a plurality of communication links; and
a controller configured to control allocation of the communication resources among the communication links, wherein
the controller is separate and independent from the first stations, said allocation is performed in accordance with information transmitted from each of the first stations, wherein the information from each of the first stations comprises a data block embedding a coded value of a length of a data queue in each of the first stations, and
the controller is configured to determine based at least in part on the coded value whether the length of the data queue exceeds a segment rate and, in an instance in which it is determined that the length of the data queue exceeds the segment rate, allocate additional communication resources for a communication link.

10. The system according to claim 9, wherein said controller is part of a base station.

11. The system according to claim 9, wherein each of said first stations are configured to transmit a transmission comprising a plurality of data blocks, and wherein the coded value of the length of a data queue of one of the first stations is provided in each of said data blocks in the transmission associated with said one first station.

12. An apparatus, comprising:
a processor configured to cause the apparatus to at least:
control allocation of communication resources for a mobile station, wherein the allocation is based upon queue length information received from the mobile station that is embedded in a data block, and
use the queue length information as an indication of future need of communication resources for the mobile station, the processor being configured to cause the apparatus to use the queue length information and control allocation of communication resources at least in part by:
determining, based at least in part on the queue length information, whether the length of a data queue exceeds a segment rate; and
in an instance in which it is determined that the length of the data queue exceeds the segment rate, allocating additional communications resources to the mobile station based at least in part on the queue length information.

13. The apparatus according to claim 12, wherein the controller is further configured to decode a code representative of the queue length information for the mobile station.

14. The apparatus according to claim 13, wherein each of said data packets comprises said queue length information.

15. The apparatus according to claim 13, wherein the code comprises information about a transmit buffer for the mobile station.

16. The apparatus according to claim 13, wherein the code comprises information on the additional resources needed by the mobile station.

17. The apparatus of claim 12, wherein the apparatus is configured to cause the apparatus to perform the allocation based on the queue length information included in a countdown value of the data block.

18. The apparatus of claim 12, further comprising a memory storing computer program code, wherein the at memory and stored computer program code are configured, with the processor, to cause the apparatus to at least:
control allocation of communication resources for a mobile station, and
use the queue length information as an indication of future need of communication resources for the mobile station.

19. An apparatus, comprising:
a processor configured to cause the apparatus to at least:
encode a code representative of a length of a data queue embedded in a data block, wherein the code indicates whether the length of the data queue exceeds a segment rate, and
cause transmission of data packets and said data block with said code included in the data block as a field to a network element, wherein
the length of the data queue is useable by the network element as an indication of future need of communication resources for the apparatus.

20. The apparatus according to claim 19, wherein each of said data packets comprises said code.

21. The apparatus according to claim 19, wherein the code further comprises information about a transmit buffer for the apparatus.

22. The apparatus according to claim 19, wherein the code further comprises information on additional resources needed by said apparatus.

23. The apparatus of claim 19, wherein the processor is configured to cause the apparatus to include the code representative of the queue length in a countdown value of the data block.

24. The apparatus of claim 19, further comprising a memory storing computer program code, wherein the at memory and stored computer program code are configured, with the processor, to cause the apparatus to at least:
encode a code representative of a length of a data queue embedded in a data block, and
cause transmission of data packets and said data block with said code included in the data block as a field to a network element.

25. An apparatus, comprising:
decoder means for decoding a code representative of a length of a data queue in a mobile station, wherein the length of the data queue is embedded in a data block from the mobile station;
means for determining, based at least in part on the decoded code, whether the length of the data queue exceeds a segment rate and
controller means for controlling allocation of communication resources, the controller means comprising means for, in an instance in which it is determined that the length of the data queue exceeds the segment rate, allocating additional communications resources for the mobile station based at least in part on the code, and
the controller means is configured to use the information about the length of the data queue as an indication of future need of communication resources for the mobile station.

26. An apparatus, comprising:
data queue means for receiving data packets;
encoder means for encoding a code representative of a length a data queue, wherein the encoder means is configured to embed the length of the data queue in a data block, wherein the code indicates whether the length of the data queue exceeds a segment rate; and
transmitter means for transmitting said data packets and said data block to a network element, wherein
said code is included in the data block as a field, and
the length of the data queue is useable by the network element as an indication of future need of communication resources for the apparatus.

27. A method, comprising:
encoding a code representative of a length of a data queue in a first network element, wherein the length of the data queue is embedded in a data block and the data queue is configured to receive the data block, wherein the code indicates whether the length of the data queue exceeds a segment rate; and
causing transmission of data packets comprising a field comprising said code to a second network element, wherein
said code is useable when allocating communication resources for a transmission between the first network element and the second network element, and
the length of the data queue is useable by the second network element as an indication of future need of communication resources in the first network element.

28. The method according to claim 27, wherein the encoding of the code further comprises encoding information about a transmit buffer of the first network element.

29. The method according to claim 27, wherein the encoding of the code further comprises encoding information on additional resources needed by said first network element.

30. The method according to claim 27, wherein the first network element comprises a mobile station and the second network element comprises a base station of a wireless communication network.

31. The method of claim 27, wherein the encoding further comprises encoding the code representative of the length of the data queue in a countdown value of the data block.

32. The method of claim 27, further comprising:
determining whether the length of the data queue exceeds the segment rate; and
wherein encoding the code comprises encoding the code based at least in part on the determination of whether the length of the data queue exceeds the segment rate.

33. The method of claim 27, wherein:
in an instance in which the length of the data queue is less than the segment rate, encoding the code comprises encoding a code having a value less than a predefined value; and
in an instance in which the length of the data queue exceeds the segment rate, encoding the code comprises encoding a code having a value that is at least the predefined value.

34. A non-transitory computer-readable storage medium storing a computer program, the program configured to control a processor to perform a process, the process comprising:
monitoring a length of a data queue in a first network element as an indication of future need of communication resources in the first network element, wherein the monitoring comprises monitoring a coded value of the length of the data queue in the first network element, and wherein the length of the data queue is embedded in a data block from the first network element;
determining, based at least in part on the coded value, whether the length of the data queue exceeds a segment rate; and
allocating the communications resources for a transmission between the first network element and a second network element based at least in part on the coded value.

35. A non-transitory computer-readable storage medium storing a computer program, the program configured to control a processor to perform a process, the process comprising:
encoding a code representative of a length of a data queue in a first network element, wherein the data queue is configured to receive data, and wherein the length of the data queue is embedded in a data block from the first network element, wherein the code indicates whether the length of the data queue exceeds a segment rate; and
causing transmission of data packets comprising a field comprising said code to a second network element, wherein
said code is useable when allocating communication resources for a transmission between the first network element and the second network element, and
the length of the data queue is useable by the second network element as an indication of future need of communication resources in the first network element.

36. An apparatus, comprising:
a processor configured to cause the apparatus to at least:
monitor a length of a data queue in a first network element as an indication of future need of communication resources in the first network element, wherein the processor is configured to cause the apparatus to monitor the length of the data queue at least in part by monitoring a coded value of the length of the data queue in the first network element, and wherein the coded value of the length of the data queue is embedded in a data block from the first network element;
determine, based at least in part on the coded value, whether the length of the data queue exceeds a segment rate; and
in an instance in which it is determined that the length of the data queue exceeds the segment rate, allocate additional communications resources for a transmission between the first network element and the apparatus based at least in part on the the coded value.

37. The apparatus according to claim 36, wherein the processor is further configured to cause the apparatus to monitor information about a transmit buffer of the first network element.

38. The apparatus according to claim 36, wherein the processor is further configured to cause the apparatus to monitor information on additional resources needed by said first network element.

39. The apparatus according to claim 36, wherein the first network element comprises a mobile station and the apparatus comprises a base station of a wireless communication network.

40. The apparatus according to claim 36, wherein the processor is further configured to cause the apparatus to perform the monitoring by receiving data packets and wherein each of a plurality of the data packets comprises the coded value.

41. The apparatus of claim 36, wherein the processor is configured to cause the apparatus to monitor a countdown value of the data block for the indication of the length of the data queue.

42. The apparatus of claim 36, further comprising a memory storing computer program code, wherein the at memory and stored computer program code are configured, with the processor, to cause the apparatus to at least:
monitor a length of a data queue in a first network element as an indication of future need of communication resources in the first network element, and
allocate the communications resources for a transmission between the first network element and the apparatus.

43. An apparatus, comprising:
monitoring means for monitoring a length of a data queue in a first network element as an indication of future need of communication resources in the first network element, wherein the monitoring means comprises means for monitoring a coded value of the length of the data queue in the first network element, and wherein the coded value is embedded in a data block from the first network element;
means for determining, based at least in part on the coded value, whether the length of the data queue exceeds a segment rate; and
allocating means for in an instance in which it is determined that the length of the data queue exceeds the segment rate, allocating additional communications resources for a transmission between the first network element and the apparatus based at least in part on the coded value.

44. A method, comprising:
controlling allocation of communication resources for a mobile station by a controller, wherein the allocation is based upon queue length information received from the mobile station that is embedded in a data block; and using, by the controller, the queue length information as an indication of future need of communication resources for the mobile station, wherein using the queue length information and controlling allocation of communication comprises:
determining, based at least in part on the queue length information, whether the length of a data queue exceeds a segment rate; and
in an instance in which it is determined that the length of the data queue exceeds the segment rate, allocating additional communications resources to the mobile station based at least in part on the queue length information.

45. The method according to claim 44, further comprising: decoding, by the controller, a code representative of the queue length information for the mobile station.

46. The method according to claim 45, further comprising: receiving a plurality of data packets, wherein each of said data packets comprises said queue length information.

47. The method according to claim 45, wherein the decoding of the code comprises decoding information about a transmit buffer for the mobile station.

48. The method according to claim 45, wherein the decoding of the code further comprises decoding information on the additional resources needed by the mobile station.

49. The method of claim 44, wherein the controlling further comprises performing the allocation based on the queue length information included in a countdown value of the data block.

50. A non-transitory computer-readable storage medium storing a computer program, the program configured to control a processor to perform a process, the process comprising:
controlling allocation of communication resources for a mobile station, wherein the allocation is based upon queue length information received from the mobile station that is embedded in a data block; and
using the queue length information as an indication of future need of communication resources for the mobile station, wherein using the queue length information and controlling allocation of communication comprises:
determining, based at least in part on the queue length information, whether the length of a data queue exceeds a segment rate; and
in an instance in which it is determined that the length of the data queue exceeds the segment rate, allocating additional communications resources to the mobile station based at least in part on the queue length information.

51. An apparatus, comprising:
controlling means for controlling allocation of communication resources for a mobile station; and
allocating means for performing the allocation based upon queue length information received from the mobile station that is embedded in a data block, wherein
the allocating means is configured to use the queue length information as an indication of future need of communication resources for the mobile station by determining, based at least in part on the queue length information, whether a length of a data queue exceeds a segment rate, and, in an instance in which it is determined that the length of the data queue exceeds the segment rate, allocating additional communications resources to the mobile station based at least in part on the queue length information.

52. A method, comprising:
encoding a code representative of a length of a data queue embedded in a data block in a first network element, wherein the code indicates whether the length of the data queue exceeds a segment rate; and
causing transmission of data packets and said data block with said code included in the data block as a field to a second network element, wherein
the length of the data queue is useable by the second network element as an indication of future need of communication resources for the first network element.

53. The method according to claim 52, wherein said causing transmission of said data packets comprises causing transmission of a plurality of data packets, and wherein each of said plurality of data packets comprises said code.

54. The method according to claim 52, wherein the encoding of the code further comprises encoding information about a transmit buffer for the first network element.

55. The method according to claim 52, wherein the encoding of the code further comprises encoding information on additional resources needed by said first network element.

56. The method of claim 52, wherein the encoding further comprises including the code representative of the queue length in a countdown value of the data block.

57. A non-transitory computer-readable storage medium storing a computer program, the program configured to control a processor to perform a process, the process comprising:
encoding a code representative of a length of a data queue embedded in a data block by a first network element, wherein the code indicates whether the length of the data queue exceeds a segment rate; and
causing transmission of data packets and said data block with said code included in the data block as a field to a second network element, wherein
the length of the data queue is useable by the second network element as an indication of future need of communication resources for the first network element.

58. An apparatus, comprising:
encoding means for encoding a code representative of a length of a data queue embedded in a data block, wherein the code indicates whether the length of the data queue exceeds a segment rate; and
transmitting means for transmitting data packets and said data block with said code included in the data block as a field to a network element, wherein
the length of the data queue is useable by the network element as an indication of future need of communication resources for the apparatus.

59. An apparatus, comprising:
a processor configured to cause the apparatus to at least:
encode a code representative of a length of a data queue in the apparatus, wherein the length of the data queue is embedded in a data block and the data queue is configured to receive the data block, wherein the code indicates whether the length of the data queue exceeds a segment rate, and
cause transmission of data packets comprising a field comprising said code to a network element, wherein
said code is useable when allocating communication resources for a transmission between the apparatus and the network element, and
the length of the data queue is useable by the network element as an indication of future need of communication resources for the apparatus.

60. The apparatus according to claim 59, wherein the code further comprises information about a transmit buffer of the apparatus.

61. The apparatus according to claim 59, wherein the code further comprises information on additional resources needed by the apparatus.

62. The apparatus according to claim 59, wherein the apparatus comprises a mobile station and the network element comprises a base station of a wireless communication network.

63. The apparatus of claim 59, wherein the processor is configured to cause the apparatus to encode the code representative of the length of the data queue in a countdown value of the data block.

64. The apparatus of claim 59, further comprising a memory storing computer program code, wherein the at memory and stored computer program code are configured, with the processor, to cause the apparatus to at least:
  encode a code representative of a length of a data queue in the apparatus, and cause transmission of data packets comprising a field comprising said code to a network element.

65. A non-transitory computer-readable storage medium storing a computer program, the program configured to control a processor to perform a process, the process comprising:
  encoding a code representative of a length of a data queue in a first network element, wherein the length of the data queue is embedded in a data block and the data queue is configured to receive the data block, wherein the code indicates whether the length of the data queue exceeds a segment rate; and
  causing transmission of data packets comprising a field comprising said code to a second network element, wherein
  said code is useable when allocating communication resources for a transmission between the first network element and the second network element, and
  the length of the data queue is useable by the second network element as an indication of future need of communication resources for the first network element.

66. An apparatus, comprising:
  encoding means for encoding a code representative of a length of a data queue in the apparatus, wherein the length of the data queue is embedded in a data block and the data queue is configured to receive the data block, wherein the code indicates whether the length of the data queue exceeds a segment rate; and
  transmitting means for transmitting data packets comprising a field comprising said code to a network element, wherein
  said code is useable when allocating communication resources for a transmission between the apparatus and the network element, and
  the length of the data queue is useable by the network element as an indication of future need of communication resources for the apparatus.

* * * * *